Aug. 4, 1931.  S. C. BOND  1,817,608
BAR SIZING OR SHAVING MACHINE
Filed March 11, 1929  4 Sheets-Sheet 2

Fig. 2

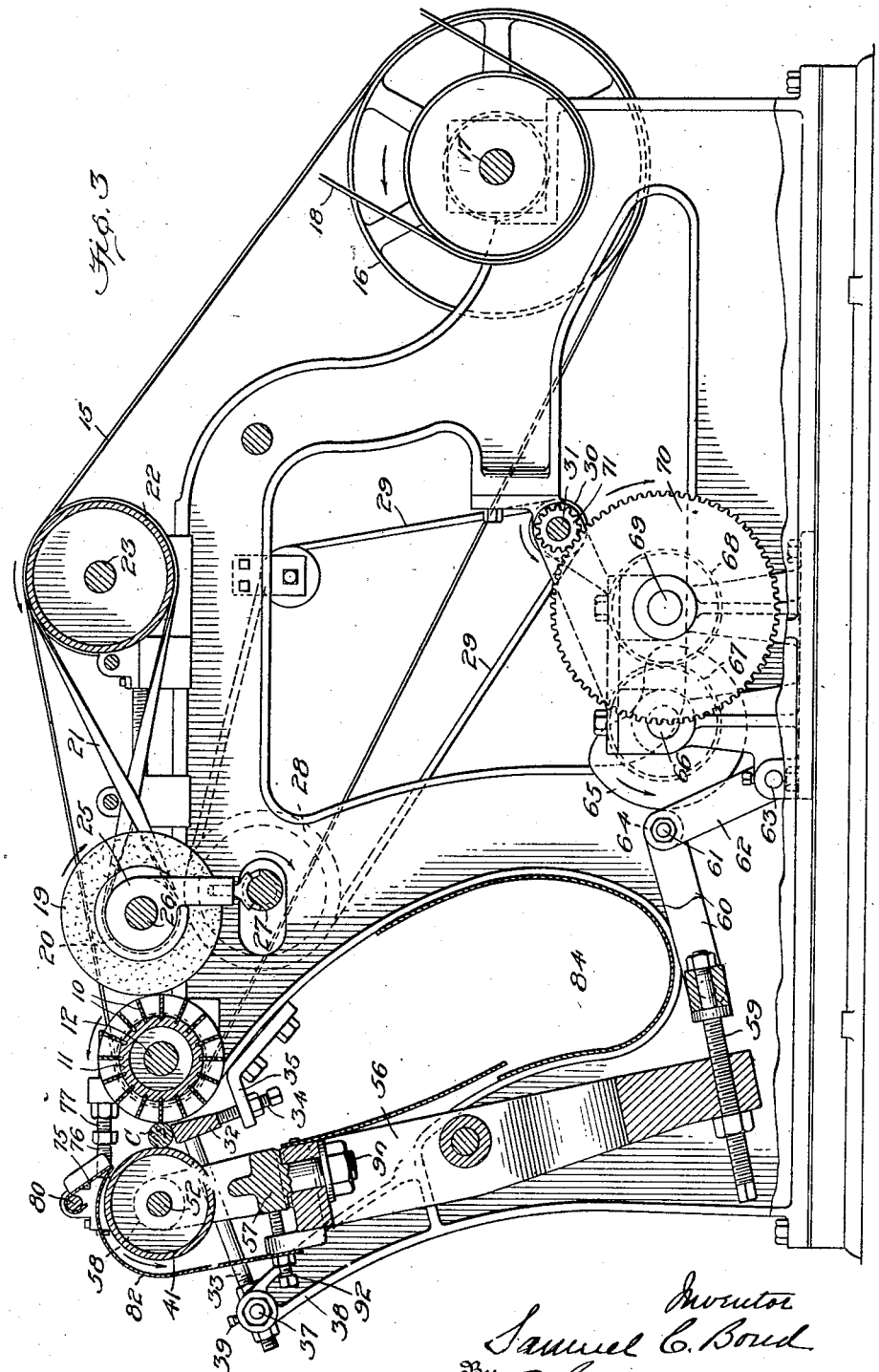

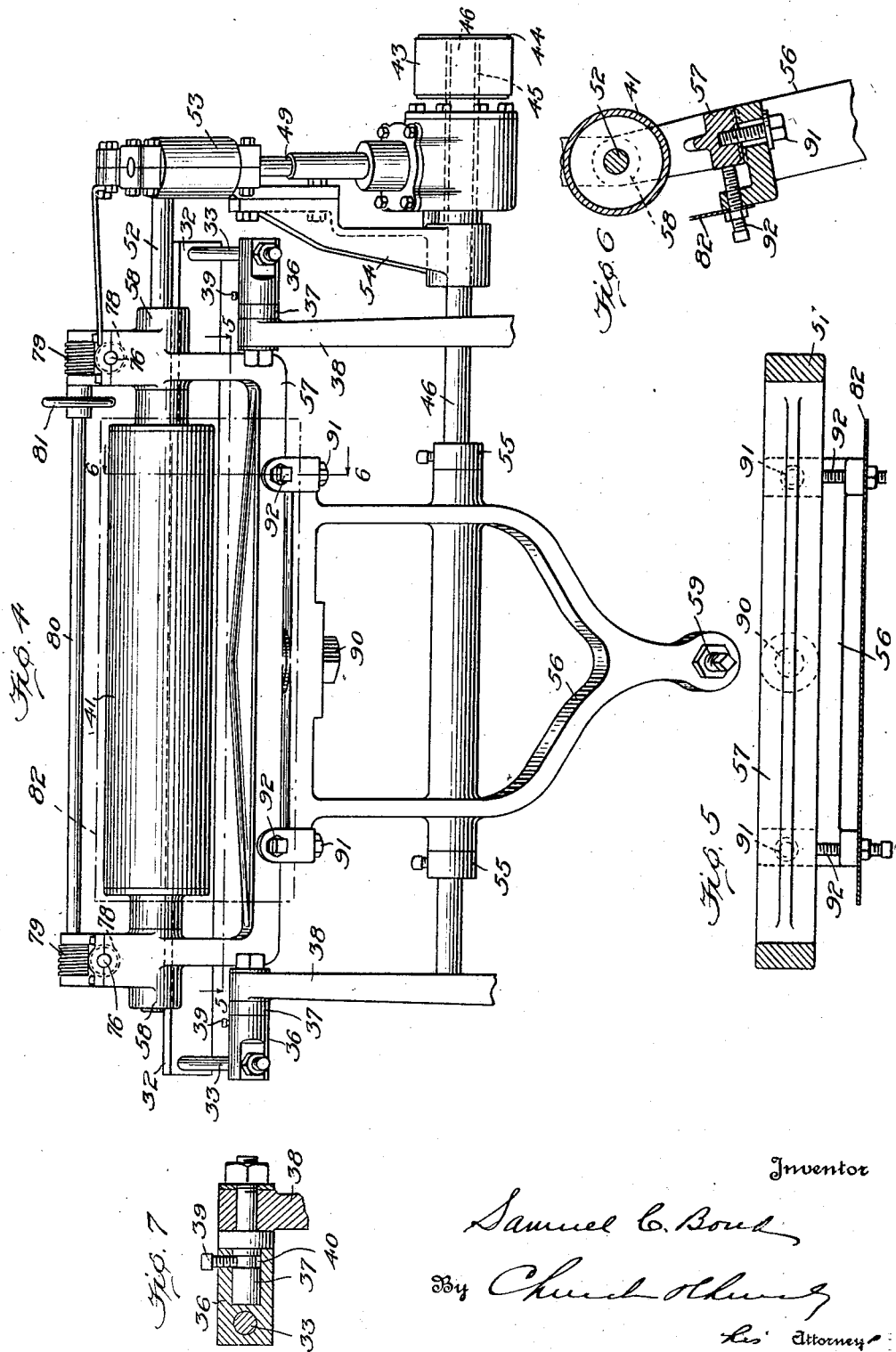

Patented Aug. 4, 1931

1,817,608

UNITED STATES PATENT OFFICE

SAMUEL C. BOND, OF HOLLYOAK, DELAWARE, ASSIGNOR TO THE HENRY P. SCOTT COMPANY, A CORPORATION OF DELAWARE, AS TRUSTEE

BAR SIZING OR SHAVING MACHINE

Application filed March 11, 1929. Serial No. 346,060.

This invention relates to improvements in apparatus for sizing soft or resilient material, and particularly to a machine for cutting and sizing bars of cork.

In the manufacture of cork articles, for instance, cork discs for bottle crowns and the like, the comminuted cork particles are molded in elongated bars of more or less circular cross section. These bars may then be sized or reduced to the proper diameter. Heretofore, attempts have been made to perform this sizing on a machine wherein the bar of cork is revolved between two rollers, one provided with an abrasive surface for grinding off a portion of the bar, while the other of said two rollers serves the purpose of holding the bar against the grinding roller, the two rollers in conjunction with one another revolving the bar during such grinding operation. It has, however, been definitely ascertained that the heat generated by the friction between the cork bar and the abrasive surface of the grinding roller is such that the bar is distorted or expanded, at points throughout its length. This expansion of the bar is not uniform, with the result that an excessive quantity of cork is removed at those points of expansion, compared with that which is removed by the grinding roller at the points which remain normal. As a consequence, after the grinding operation is finished and the bar has returned to normal temperature and contracted, the diameter thereof is not uniform throughout its length, but is subnormal, so to speak, at those points which had expanded during the grinding operation. Again, it was found that the resin in the cork and the binder in the molded material rather quickly filled the pores of the grinding wheel, rendering it useless.

The primary object of the present invention, is to produce a cutting and sizing machine by which bars of cork of uniform cross section throughout their length may be expeditiously produced. More specifically, the invention contemplates a machine wherein the bar of cork is loosely placed on a rest between two rolls, one of which rolls, termed the cutting roll revolves on a fixed axis and has a series of spirally arranged cutting edges thereon, while the other, a grip or feed roll, is journaled in an oscillatory frame, whereby it may be moved toward and from the cutting roll for the purpose of controlling the rotation and contact of the bar of cork which has been placed on the rest, against the cutting edges of said cutting roll. In the present machine, the two rolls engaging the bar of cork which is loosely placed on the rest, serve the purpose of revolving said bar during the cutting and sizing operation.

With these and other objects in view, the invention consists in certain details of construction and combinations and arrangements of parts, all as will hereinafter be more fully described and the novel features thereof particularly pointed out in the appended claims.

In the accompanying drawings,—

Fig. 2 is a top plan view thereof;

Fig. 3 is a vertical sectional view taken centrally of the machine;

Fig. 4 is an elevational view of the oscillatory frame carrying the feed roll;

Fig. 5 is a sectional view on the line 5—5 of Fig. 4;

Fig. 6 is a detail view on the line 6—6 of Fig. 4; and

Fig. 7 is a detail sectional view of the mounting for the rest for the bar of cork.

Figure 1:
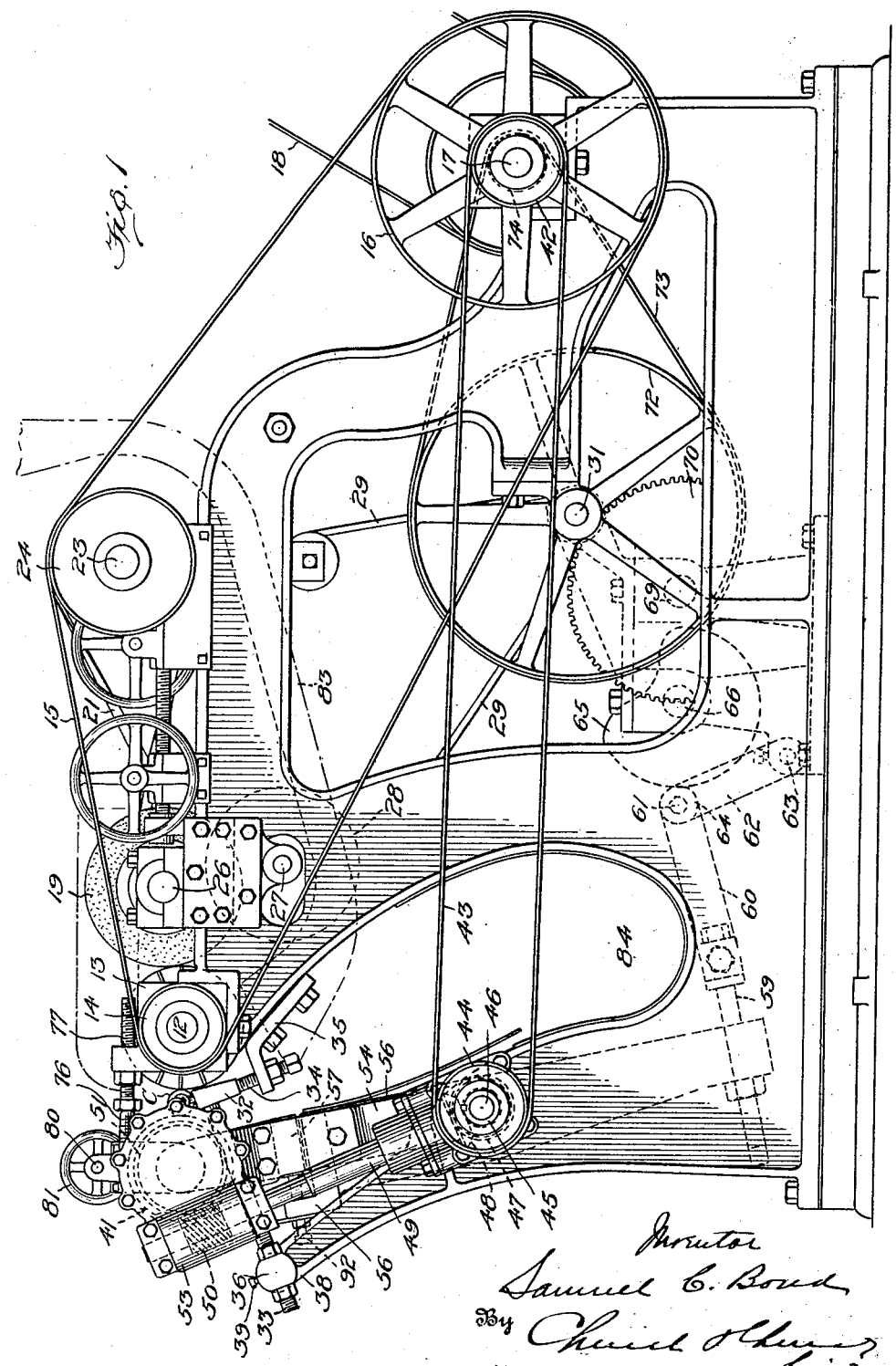
Figure 1 is a side elevational view of a machine embodying the present improvements.

In the preferred embodiment illustrated in the accompanying drawings, the means for performing an actual cutting operation on the bar of cork consists of a plurality of spirally arranged knives 10, extending in opposite directions on the cylinder 11 mounted on a shaft 12 which is journaled in bearings 13 in the machine frame. At its ends, said shaft 12 is provided with pulleys 14 over which drive belts 15 extend, whereby the knives may be rotated in the direction indicated by the arrow in Fig. 3, from the drive pulley 16 on the main drive shaft 17. Shaft 17 is driven from any suitable source of power by a belt 18 (Figs. 1 and 3). The cutting edges of the knives are kept sharp by a grinding wheel 19 which is rotated by pulley 20, belt 21, and cylinder 22, mounted on a shaft 23, whose ends are provided with pulleys 24 over which the drive belts 15 run. The sharpening wheel 19 is reciprocated back and forth along the cutting knives by being journaled on a sleeve 25 traveling with guide bar 26. Said guide bar 26 is reciprocated back and forth by a traversing shaft 27 provided at one end with a pulley 28, said pulley being driven by a belt 29 from pulley 30 on shaft 31, to which radial motion is imparted by connections which will be later described.

Positioned in front of the cutting knives 10 is a rest 32 supported from the main frame of the machine. Said rest is preferably supported by rods 33 threaded through the machine frame and rods 34 threaded through a bracket 35 mounted on the frame. As will be apparent, the position of the bar may be varied tangentially of the cutting knives and radially of said knives by adjusting said rods 33, 34. Rods 33 are swiveled on the machine frame for this purpose. As shown in Fig. 7, rods 33 project through a cap piece 36 which is journaled on a bearing member 37 secured in frame 38 of the machine, said cap piece being retained on said member by a screw 39 projecting through said cap piece and engaging in a groove 40 in said member 37.

A bar of cork "C" deposited on rest 32 is adapted to lie between the cutting knives 10 and what would be termed a feed roll 41, which is driven in the direction of the arrow in Fig. 3. Said roll 41 is journaled in a frame that may be rocked so as to move said roll 41 toward and from the knives, the movement of said roll toward the knives serving the purpose of pressing the bar of cork which may be on the rest 32 against the cutting knives in order that the desired amount of cork will be removed from the bar. The rotation of the feed roll and the cutting knives with the bar of cork held between them effects a rotation of the bar of cork during the cutting operation. By means to be later described, the rocking movement of the feed roll supporting frame is limited so that successive bars of cork placed on the rest 32, will be uniformly sized. In the preferred arrangement, the feed roller 41 is driven from pulley 42 on drive shaft 17 by belt 43 extending over a pulley 44 mounted on a sleeve 45. Sleeve 45 is journaled on a rod 46 mounted in the frame of the machine. Sleeve 45 also carries a bevel gear 47, meshing with a corresponding bevel gear 48 on a shaft 49 whose upper end is provided with a worm 50 which meshes with a worm wheel 51 on the shaft 52 on which said feed roll is mounted. Worm 50 is enclosed within the casing 53 and said casing, together with shaft 49, is supported by a bracket 54, loose on rod 46. Bracket 54 is loosely mounted so that it, together with sleeve 45, may be rocked on rod 46 when the feed roller is rocked toward and from the cutting knives, as will now be described.

Loose on rod 46, but held against movement longitudinally thereof by collars 55, is a yoke 56 in the upper portion of which is mounted a bracket 57 formed with bearings 58 for the shaft 52 on which feed roll 41 is mounted.

Preferably bracket 57 is swiveled on yoke 56 by a threaded bolt 90. By loosening screws 91, 92, which normally hold the bracket against movement on said bolt, either end of the bracket, together with feed roll 41, may be adjusted toward or from the rest 32 and cutting knives 10.

Below rod 46, yoke 56 is connected by a threaded rod 59 to links 60, which are in turn connected by a pivot 61 to links 62, pivotally mounted at the base of the machine on pin 63. Pivot pin 61 carries a cam roller 64 engaging against the surface of a cam 65 mounted on shaft 66. Mounted on shaft 66 is a gear 67 that meshes with a gear 68 on a shaft 69 which also carries a gear 70 meshing with gear 71 on shaft 31. Shaft 31 carries a comparatively large pulley 72 driven by belt 73 from pulley 74 on the main drive shaft 17. As will be understood, rotary motion imparted to cam 65 through the connections just described, will, when the high portion of said cam engages cam roll 64, throw the lower portion of yoke 56 outward and move the upper portion, carrying the feed roll 41, toward the cutting knives. It is just prior to the completion of this movement that a bar of cork is placed on chute 75 (Fig. 3) from which it drops onto the bar rest 32. As the low portion of cam 65 comes into engagement with cam roller 64, the yoke 56 will be moved to retract feed roll 41 from the cutting knives by gravity, as the throw imparted to it in moving toward said knives does not carry it past the vertical center about which it rocks. The throw imparted to yoke 56 may be regulated by adjusting the threaded rod 59 which connects the yoke with links 60 and by threaded pins 76 in bracket 57 engaging adjustable stop members 77 on the machine frame. As shown, the stop pins 76 are provided with worm wheels 78 engaging worms 79 on a shaft 80 which may be revolved by hand wheel 81 so as to adjust pins 76 relatively to the stop members 77.

With the present machine, it has been found that the spirally arranged cutting knives actually cut and remove the desired quantity of material from the periphery of the cork bar, and any number of successive bars can be turned out with uniform diameter, not only with respect to each other, but each bar is of uniform diameter throughout its own length. This result is believed to be obtained by reason of the fact that by removing the cork by an actual cutting operation instead of by an abrasive action, the heat heretofore generated by the abrading rolls is eliminated so that there is no distortion or expansion of the cork bar and the consequent removal of excessive quantities of material at different points along the length of the individual bars.

To protect operatives working at the machine, a guard 82 is mounted on bracket 56 in front of the feed roll 41 and the cork dust is drawn off through a suction pipe 83 shown in outline in Figure 1. A reservoir 84 is formed below the roller 41 and cutting knives 10 so that after each roll has been sized, it will fall off of rest 32 and drop into the reservoir upon the retraction of roller 41 away from the knives 10. In this connection, it will be noted that rest 32 is inclined to the horizontal so the bar of cork will remain thereon only so long as it is held there by the feed roll.

What is claimed is:

1. In a machine for cutting and sizing cork bars and the like, the combination of a rotatable roll having a plurality of spirally arranged cutting edges, a support for the bars, and a rotatable feed roll movable toward and from said support and cutting roll to press the bars against the cutting roll and rotate the bars in conjunction with said cutting roll.

2. In a machine for cutting and sizing cork bars and the like, the combination of a rotatable roll having a cutting edge thereon arranged obliquely to the axis of said roll, a support for the bars, a feed roll movable toward and from said cutting roll to press the bars against said cutting roll and rotate said bars in conjunction with said cutting roll, and means for adjusting the pressure exerted on said bars.

3. In a machine for cutting and sizing cork bars and the like, the combination of a rotatable roll having a cutting edge thereon arranged obliquely to the axis of said roll, a support for the bars, a feed roll movable toward and from said cutting roll to press the bars against said cutting roll and rotate said bars in conjunction with said cutting roll, and means for altering the extent of movement of the feed roll toward and from the cutting roll.

4. In a machine for cutting and sizing bars of cork, the combination of a rotatable member having a series of cutting knives arranged spirally thereon, a bar rest adjacent said knives, and means engaging a bar on said rest to press the same against said knives, said means and said rotatable knives acting in conjunction with each other to revolve a bar on said rest.

5. In a machine for cutting and sizing bars of cork, the combination of a rotatable roll having a series of spirally arranged cutting edges thereon, a bar rest adjacent said knives, means for adjusting said rest radially of said roll, and a rotatable roll adapted to engage a bar of cork on said rest and force the bar against said knives, said bar being rotatable by its frictional engagement with said rolls.

6. In a machine for cutting and sizing bars of cork, the combination of a series of rotatable spirally disposed cutting knives, a bar rest, an oscillatory frame, a feed roll journaled in said frame, and means for oscillating said frame to move it toward and from said knives to engage a bar of cork on said rest and press it against said cutting knives, said bar being rotatable by its engagement with said roll and knives.

7. In a machine for cutting and sizing bars of cork, the combination of a series of rotatable spirally arranged cutting knives, a rest for the bars of cork, means for adjusting said rest toward and from said knives, a frame, a feed roll journaled in said frame, means for oscillating said frame to move the feed roll toward and from said knives and engage a bar of cork and force the same against said knives, and means for varying the throw of said oscillatory frame.

8. In a machine for sizing cork bars and the like, a bar rest having a straight surface upon which the bar is bodily supported from beneath, a cutting roll disposed along one side of said bar rest and having a plurality of spirally arranged cutting edges, means for rotating said roll, and means for bodily urging said bar against said cutting edges and effecting rotation of said bar with said roll by frictional engagement therewith.

9. In a machine for sizing a cork bar or the like, a cutting roll provided with a plurality of spirally arranged cutting edges, a support for the bar disposed adjacent said cutting roll and having its top surface so inclined that a bar placed thereon is normally urged by gravity to roll out of contact with said cutting roll and leave said support, and a rotatable feed roll movable toward said support and cutting roll for pressing the bar against the cutting roll during the sizing operation and movable away from said support and cutting roll upon completion of the sizing operation to permit the sized bar to leave said support.

SAMUEL C. BOND.